United States Patent
Haas et al.

(10) Patent No.: US 9,694,461 B2
(45) Date of Patent: Jul. 4, 2017

(54) TRANSFER CENTER FOR MACHINING AT LEAST ONE WORKPIECE

(71) Applicant: ANGER MACHINING GMBH, Traun (AT)

(72) Inventors: Roland Haas, St. Georgen an der Gusen (AT); Friedrich Pernkopf, Linz (AT)

(73) Assignee: Anger Machining GmbH, Traun (AT)

( * ) Notice: Subject to any disclaimer, the term of this patent is extended or adjusted under 35 U.S.C. 154(b) by 119 days.

(21) Appl. No.: 14/399,700

(22) PCT Filed: May 7, 2013

(86) PCT No.: PCT/AT2013/050104
§ 371 (c)(1),
(2) Date: Nov. 7, 2014

(87) PCT Pub. No.: WO2013/166539
PCT Pub. Date: Nov. 14, 2013

(65) Prior Publication Data
US 2015/0117973 A1   Apr. 30, 2015

(30) Foreign Application Priority Data

May 7, 2012   (AT) .................................. A 533/2012

(51) Int. Cl.
*B23Q 39/02* (2006.01)
*B23Q 1/26* (2006.01)
(Continued)

(52) U.S. Cl.
CPC ............. *B23Q 39/022* (2013.01); *B23Q 1/26* (2013.01); *B23Q 11/0028* (2013.01);
(Continued)

(58) Field of Classification Search
CPC .. B23Q 11/001; B23Q 11/0028; B23Q 23/00; B23Q 39/022; Y10T 409/309576;
(Continued)

(56) References Cited

U.S. PATENT DOCUMENTS 3,276,329 A * 10/1966 Saliba ..................... B23B 39/14
                                                         408/237
3,371,580 A *  3/1968 Barnes ................... B23Q 1/525
                                                         144/96
(Continued)

FOREIGN PATENT DOCUMENTS

DE         3708412 A1      9/1988
DE         4333196 A1      4/1994
(Continued)

*Primary Examiner* — Daniel Howell
*Assistant Examiner* — Yasir Diab

(57) ABSTRACT

A transfer center for machining at least one workpiece is disclosed, having a machine frame, having a plurality of preferably stationary machining spindles arranged in the machine frame—particularly in a machining head, having a workpiece carrier on which at least one workpiece to be machined is arranged by means of a respective clamping device, and having a workpiece manipulator arranged in the machine frame, onto which workpiece manipulator the workpiece carrier is flange-mounted and which is movable by drive means in at least one spatial direction in relation to the machine frame. To achieve a high machining accuracy in parallel machining, according to one proposal, the transfer center—in order to compensate for a deviation between the actual position and the desired position of the workpiece or workpieces—has a position compensation system with at least two pressure elements situated between the workpiece or workpieces and the machine frame, whose operating directions enclose an angle with each other.

15 Claims, 9 Drawing Sheets

(51) Int. Cl.
  *B23Q 23/00* (2006.01)
  *B23Q 11/00* (2006.01)
(52) U.S. Cl.
  CPC ............ *B23Q 23/00* (2013.01); *B23Q 11/001* (2013.01); *Y10T 408/175* (2015.01); *Y10T 408/385* (2015.01); *Y10T 408/561* (2015.01); *Y10T 408/563* (2015.01); *Y10T 409/30868* (2015.01); *Y10T 409/309576* (2015.01); *Y10T 409/309744* (2015.01)
(58) Field of Classification Search
  CPC ... Y10T 409/309744; Y10T 409/30868; Y10T 408/175; Y10T 408/561; Y10T 408/563; Y10T 408/5635
  See application file for complete search history.

(56) References Cited

U.S. PATENT DOCUMENTS

| | | | |
|---|---|---|---|
| 4,481,742 A | 11/1984 | Shimizu et al. | |
| 5,388,917 A | 2/1995 | Hibi et al. | |
| 5,760,564 A * | 6/1998 | Novak | G03F 7/70716 269/55 |
| 5,829,932 A | 11/1998 | Kis et al. | |
| 6,015,247 A * | 1/2000 | Branaman | B23B 47/28 144/365 |
| 2002/0180133 A1 * | 12/2002 | Oshima | B23Q 1/4866 269/73 |
| 2004/0046294 A1 * | 3/2004 | Kubo | F16C 32/0603 267/136 |
| 2004/0265078 A1 * | 12/2004 | Boyl-Davis | B23B 39/14 408/1 R |
| 2011/0131791 A1 | 6/2011 | Haas et al. | |
| 2013/0302104 A1 | 11/2013 | Hagspiel | |

FOREIGN PATENT DOCUMENTS

| | | |
|---|---|---|
| DE | 19619103 A1 | 11/1996 |
| DE | 19859360 A1 | 7/2000 |
| DE | 202010008979 U1 | 4/2012 |
| EP | 2310166 B1 | 3/2013 |
| GB | 1273050 A | 5/1972 |
| WO | 2008076054 A1 | 6/2008 |

* cited by examiner

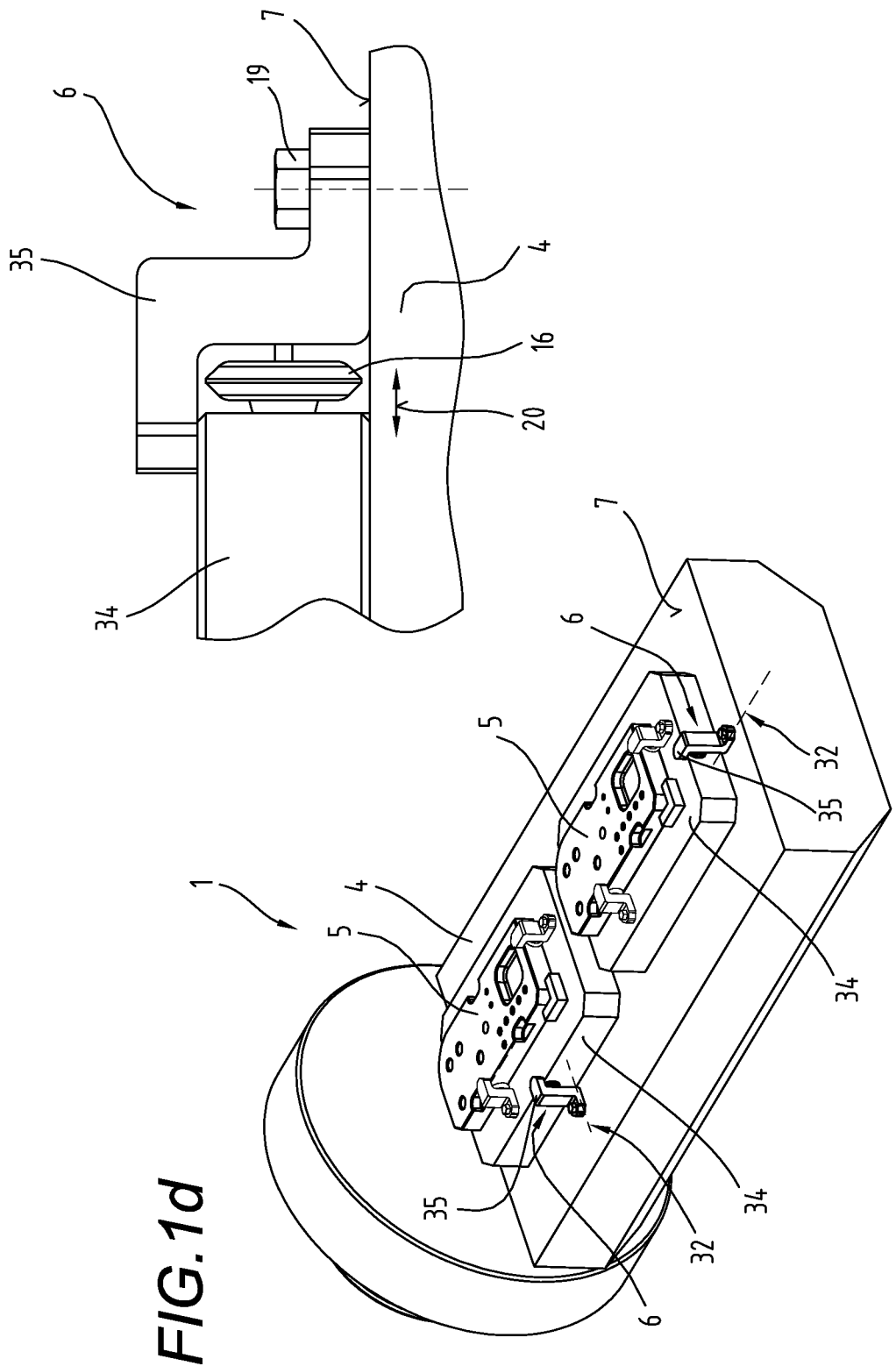

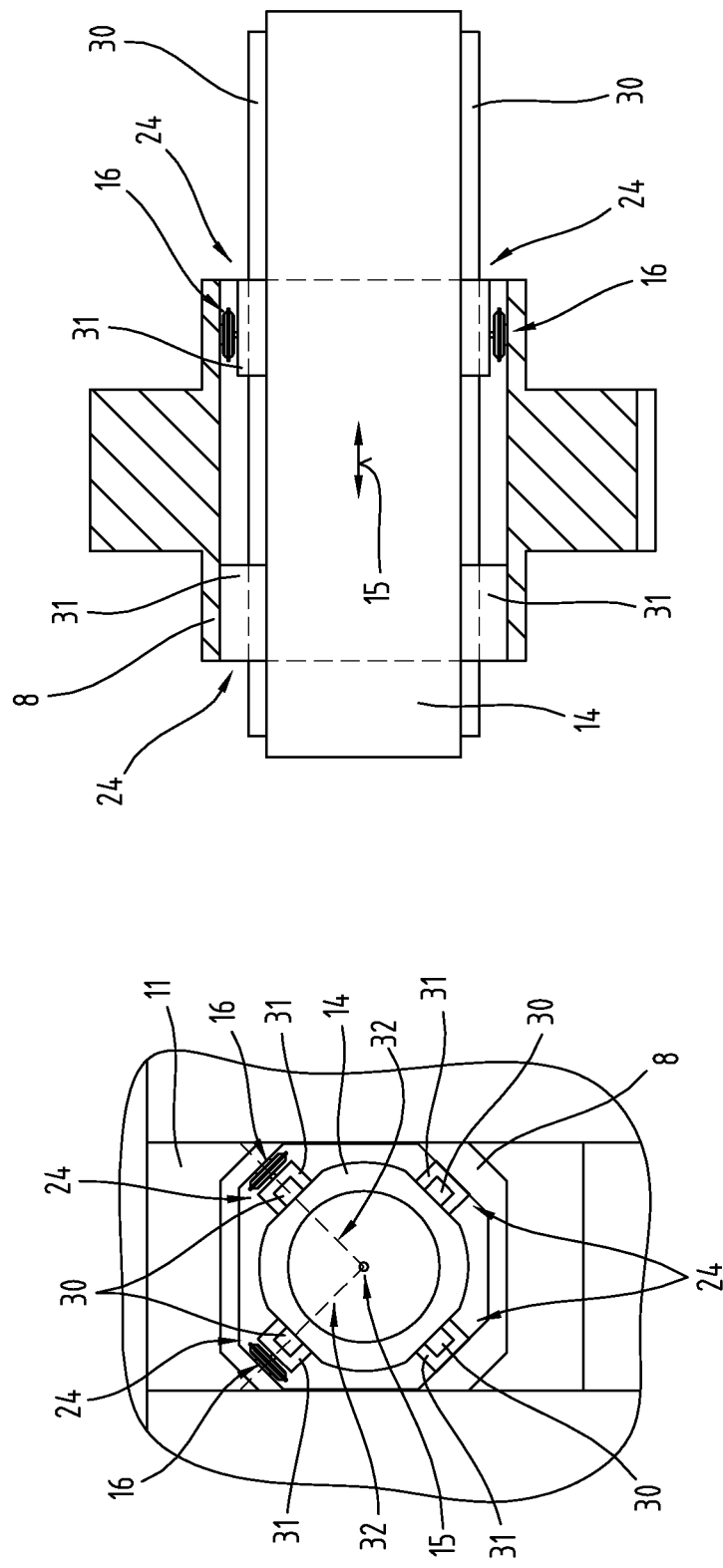

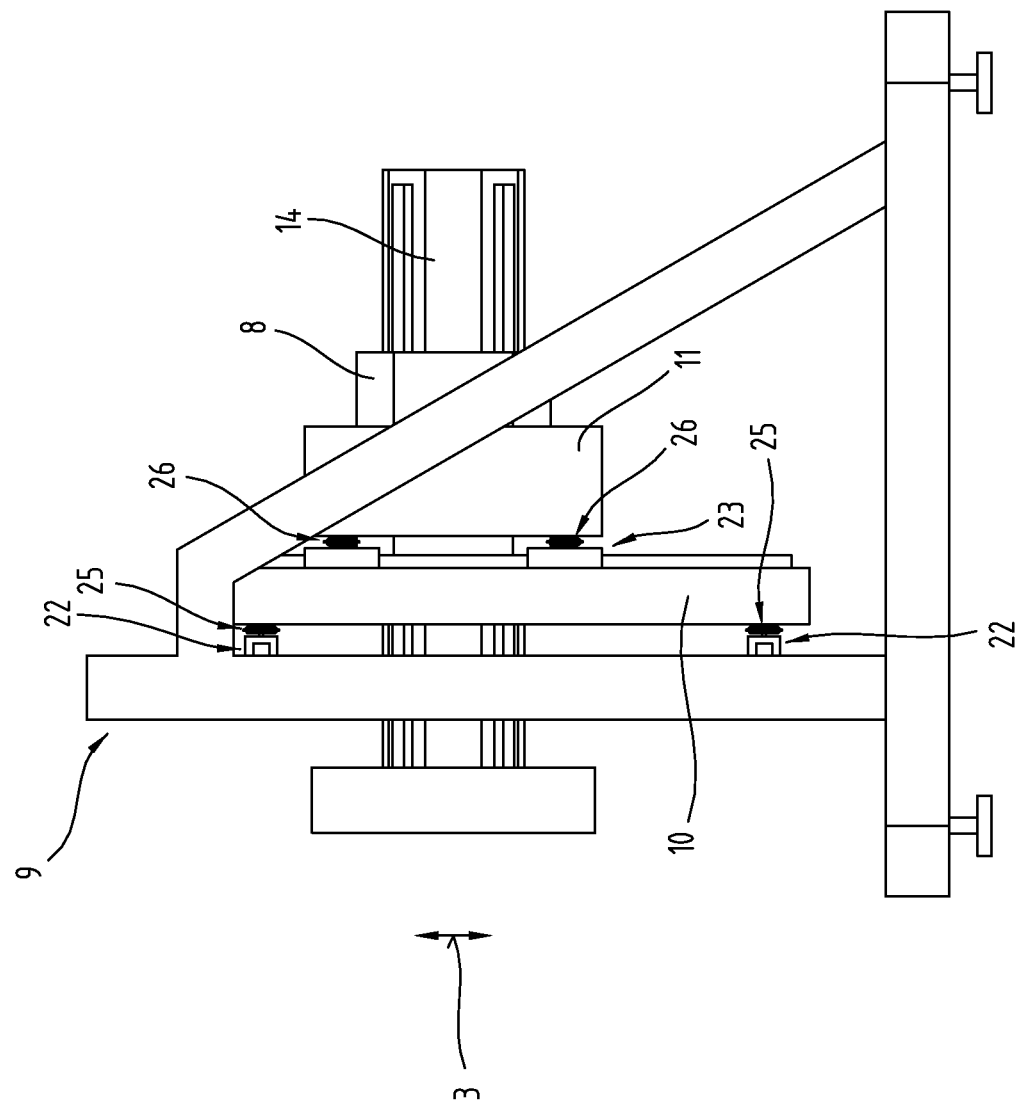

TRANSFER CENTER FOR MACHINING AT LEAST ONE WORKPIECE

FIELD OF THE INVENTION

The invention relates to a transfer center for machining at least one workpiece having a machine frame, having a plurality of preferably stationary machining spindles arranged in the machine frame—particularly in a machining head, having a workpiece carrier on which at least one workpiece to be machined is arranged by means of a respective clamping device, and having a workpiece manipulator arranged in the machine frame, onto which workpiece manipulator the workpiece carrier is flange-mounted and which is movable by drive means in at least one spatial direction in relation to the machine frame.

BACKGROUND OF THE INVENTION

In a known transfer center (EP2310166B1), the machining spindles are arranged in a spindle head so that the relative position of the individual machining spindles to one another, to the workpiece, and to the machine frame is fixed. If need be, some tool spindles can be moved between a retracted idle position and an extended working position. A position adaptation of an individual machining spindle is not provided. In a transfer center, the workpiece to be machined is guided to the tools; in addition, a spindle head is designed to execute a large number of uniform machining procedures; usually, several machining procedures are carried out simultaneously at different feature positions. This is why the requirement for precision has been transferred from the exact positioning of an individual tool to the exact alignment of the work piece in relation to a plurality of tools. A position deviation can occur, for example, due to the weight of the workpiece carrier and of the workpiece mounted on it. In addition, the load exerted by the machining results in an action of force on the workpiece carrier and, depending on the distance from the clamping or holding device, in a corresponding lever arm. In known transfer centers, the machine frame is embodied in a correspondingly massive fashion, which has an impact in the form of higher production costs. A massive tool holder, including the device for moving it, has another crucial disadvantage, though: Since the workpieces must be moved as quickly as possible between the machining positions, with a massive design, significantly more drive energy is required to accelerate the masses and decelerate them again. In addition, these movements can cause the transfer center as a whole to execute micro-vibrations, which has a negative impact on the achievable levels of precision and on surface quality. Since the relative position of the tools to each other cannot be changed, it is necessary to ensure that the workpiece is correctly aligned for machining steps and machining features. This becomes particularly more important especially when several workpieces are machined simultaneously.

For other machine tools, there are embodiments known from the prior art in which the alignment between a workpiece and a machining spindle is corrected. DE3708412A1 describes a device for regulating the level of a workpiece carrier. For this purpose, the workpiece carrier is supported in pivoting fashion at one end and at its other end, is provided with controllable pressure elements. It is thus possible to adjust the workpiece in relation to the tool consistently at the predetermined zero position. DE3708412A1 does not disclose any solution for the complex of problems that arise in a transfer center with a multi-spindle machining head because a multi-spindle machining head of this kind performs several machining procedures simultaneously and a pivoting support of a workpiece carrier does not provide any improvement in the precision of a parallel machining of this kind.

SUMMARY OF THE INVENTION

The stated object of the invention, therefore, is to modify the design of a transfer center of the type described at the beginning in such a way that a consistently high positioning accuracy of a plurality of simultaneous machining positions can be ensured, even when more than one workpiece is being machined at the same time. It should also be possible to provide a compact design of the transfer center.

The invention attains the stated object by virtue of the fact that in order to compensate for a deviation between the actual position and the desired position of the workpiece or workpieces, the transfer center has a position compensation system with at least two pressure elements situated between the workpiece or workpieces and the machine frame and the operating directions of these pressure elements enclose an angle with each other.

If the transfer center has a position compensation system with at least two pressure elements situated between the workpiece or workpieces and the machine frame and the operating directions of these pressure elements enclose an angle with each other, then it is possible to elegantly achieve a compensation for a deviation between the actual position and the desired position of the workpiece or workpieces, which can ensure extremely high positioning accuracy even in a parallel machining with a multi-spindle machining head. The angle between the two pressure elements can specifically enable a position compensation between the actual position and the desired position in at least two directions. It is conceivable here to provide any angle in order to be able to achieve the desired position compensation of the workpiece, of the workpieces, or of the workpieces relative to one another for a precise parallel machining in the transfer center. In addition to a position deviation that is caused by an incorrect alignment of the workpiece or workpieces in relation to the workpiece carrier, it is also conceivable for there to be a position deviation due to the alignment of the workpiece manipulator. According to the invention, the workpiece manipulator, which is movable in at least one spatial direction in relation to the machine frame, does not have to be taken into account in the positioning accuracy of the workpieces due to existing inaccuracies of its drive means or guidance means. In addition, the weight of the workpiece carrier and the workpiece mounted on it can cause a mechanical deformation of the workpiece carrier and/or the machine frame, which can be compensated for by the position compensation system.

It should be noted that in general, an angle should be understood to mean not only an intersecting angle of the operating directions. The operating directions can also represent degrees of skew; the crucial factor, however, is that the operating directions extend independently in linear fashion in order to permit a biaxial adjustment. In general, the pressure element or pressure elements can have an adjustment travel of up to +/−0.5 mm because this makes it possible to correct for most of the position deviations that are known to occur in machine tools.

According to one modification, the pressure element is embodied in the form of a hydraulic pressure element. Liquids are largely incompressible and are therefore able on the one hand to transmit a very high pressure, which the pressure element converts into a corresponding action of force; on the other hand, by maintaining this pressure in an appropriately stable way, it is also possible to achieve a corresponding holding action. Pressure elements embodied in the form of pressure capsules, due to their mechanical ruggedness and rigidity, are particularly suitable for the intended use according to the invention. In addition, a pressure capsule can also be used as a guide so that it can simultaneously serve as both an actuator and a bearing.

According to one modification, the operating directions of the two pressure elements lie in a plane. For example, this plane can lie parallel to a support surface on the workpiece carrier. This makes it possible to achieve a relative positioning of the workpiece or workpieces or of its/their clamping cradle or clamping cradles relative to the workpiece carrier and/or to achieve a relative movement between the workpieces. In additional or alternatively, it is possible to stipulate that the angle must be a 90 degree angle.

The clamping device with which the workpiece is clamped to the workpiece carrier can be embodied as a universal part so that it is designed for the widest variety of different applications. It is also conceivable to provide zero-point clamping systems, etc. In order to now permit a positioning of the workpiece, according to one modification, the pressure elements are situated between the clamping device or clamping devices and the workpiece carrier. In the first case, it is also possible to continue using existing clamping devices, for example the ones in which the pressure element is also clamped. In the latter case, there is no discernible change in the design of the clamping device, which can permit an unchanged clamping of workpieces.

If at least two pressure elements with an angle between their operating directions each engage a respective clamping cradle of a clamping device, then it is possible to achieve a biaxial mobility of the clamping device on the tool holder. This permits a particularly accurate alignment of the clamped workpiece. It is possible to increase this action of force and/or to increase the adjustment travel by providing a plurality of pressure elements with the same operating direction.

It can turn out to be sufficient, however, if each clamping cradle of a clamping device is engaged by a pressure element or by several pressure elements with the same operating direction in order—while simplifying the design—to be able to align the clamped workpieces for a parallel machining.

It is therefore also possible, through design means, to enable a compensation for a deviation between the actual position and the desired position of two workpieces relative to each other by virtue of the fact that each of their clamping devices is assigned a different operating direction.

An accurately positioned position adjustment of the workpiece or workpieces can be achieved if the clamping device is fastened to the workpiece carrier by means of the pressure elements. Such a suspension of the clamping device and its clamping cradle specifically makes it possible to achieve a relatively high degree of mobility. In addition, such a structural design can be embodied in a comparatively stable fashion and also requires no further change in the design of known clamping devices.

Also, one modification is comprised of the fact that at least two pressure elements are integrated into the clamping device. This produces an individually embodied clamping device, which is specifically adapted to the requirements of the respective clamping position and to the clamping requirements.

For example, if the adjusting force of a pressure element is not sufficient to carry out the position compensation under the conditions of use, then according to one modification, two pressure elements are arranged opposite each other in the same operating direction. This may be required, for example, with single-action hydraulic pressure elements. In one embodiment, the workpiece is situated between the two pressure elements. Another possible embodiment is comprised in that the two pressure elements adjoin each other. These two embodiment variants make it possible to achieve an increase in the amount of force that can be exerted and/or a doubling of the achievable adjustment travel.

If at least one pressure element is additionally provided with an in particular parallel operating direction that is linearly independent of the other two pressure elements, then not only can a linear alignment of the workpiece take place, but also the workpiece can be aligned in rotary fashion. This increased mobility of the workpiece can increase the position accuracy of the workpiece or workpieces and can thus increase the precision of the transfer center.

If the workpiece manipulator is supported in a mobile fashion on an open base frame via a first carriage and second carriage, with the first carriage being movable relative to the base frame in a first direction along two first rail guides aligned parallel to each other and the second carriage being movable relative to the base frame in a second direction along two second rail guides aligned parallel to each other, this design embodiment can be used to position the pressure elements between the base frame and the first carriage and/or between the first carriage and second carriage. It is thus possible to simplify the design of the transfer center. This is because on the one hand, the workpiece manipulator should be lightweight in order to enable a high travel speed; on the other hand, however, the manipulator should also be mechanically stable in order to be able to absorb the weight of the clamped workpiece and the forces exerted during the machining. With the arrangement of pressure elements according to the invention, it is also possible to compensate for the deformations that occur. By means of the adjustment range of the pressure elements with a corresponding ability to exert force, it is also potentially possible to embody individual components of the workpiece manipulator as less massive. According to the conventions in workpiece machining, this embodiment according to the claim permits the workpiece carrier to move in the Y-Z direction.

In general, it should be noted that "rail guide" can be understood, for example, to mean a longitudinal guide composed of a rail and a guide carriage. It can also be synonymously understood, however, to mean a flat-rail guide, a round-rail guide, a sliding guide, an electromagnetic guide, or a hydrostatic guide, this list being in no way exhaustive. A rail guide can therefore be understood to include any guidance system that has a directional or guiding part and a part that engages with this guide and follows it.

According to one modification, the operating directions of the two pressure elements lie in a plane that is oriented perpendicular to a front surface of the base frame. This plane, which is referred to as the clamping plane for better differentiation, also corresponds in the conventional way to the plane in which the workpiece is situated; depending on the workpiece and tool holder, this plane can also be an imaginary point. This modification now assures that the workpiece, which is clamped to the workpiece carrier and is usually also supported thereon, can be positioned relative to the support surface on the workpiece carrier. This has the advantage that the mechanical supporting function of the workpiece carrier is also retained in the relative positioning of the workpiece or workpieces.

In order to ensure an unimpeded relative movement of the carriages relative to each other and relative to the base frame while nevertheless being able to reliably carry out the position compensation, according to one modification, the first rail guide and/or second rail guide is composed of a longitudinal rail and at least two guide carriages, with a pressure element being situated in the region of one guide carriage. Since the preferred deviation direction is generally known based on design and load-dynamic considerations, arranging one of the two pressure elements in a guide carriage makes it possible to carry out a compensation of the expected position deviation.

Another modification is comprised in the fact that a respective pressure element is situated in the region of each of the two guide carriages. This increases compensation possibilities since with a 4-point guide, it is possible to influence the offset of each contact point of the carriage with the guiding part.

It is also possible that in addition to the movement in the Y-Z direction, the workpiece manipulator can also execute an adjusting movement in the X direction. To this end, in the second carriage, a flange support or mandrel that can be moved relative to the second carriage is provided, to which the workpiece carrier is flange-mounted. According to one modification, the pressure elements are now situated between the second carriage and the flange support. When the flange support is extended, the dead weight of the workpiece carrier and the workpiece clamped to it and the additional load during the machining can cause a deflection of the mandrel, which can be compensated for by the embodiment according to the claim. The operating directions of the two pressure elements in this case lie in a plane that is oriented parallel to a front surface of the base frame—this essentially corresponds to the Y-Z plane.

BRIEF DESCRIPTION OF THE DRAWINGS

For better comprehension, the invention will be explained in greater detail below in conjunction with the following figures. Each in a very schematic, simplified way:

FIGS. 3 a) and b) show a detailed view of the arrangement of the pressure elements.

DETAILED DESCRIPTION OF THE PREFERRED EMBODIMENTS

Figure 1A:
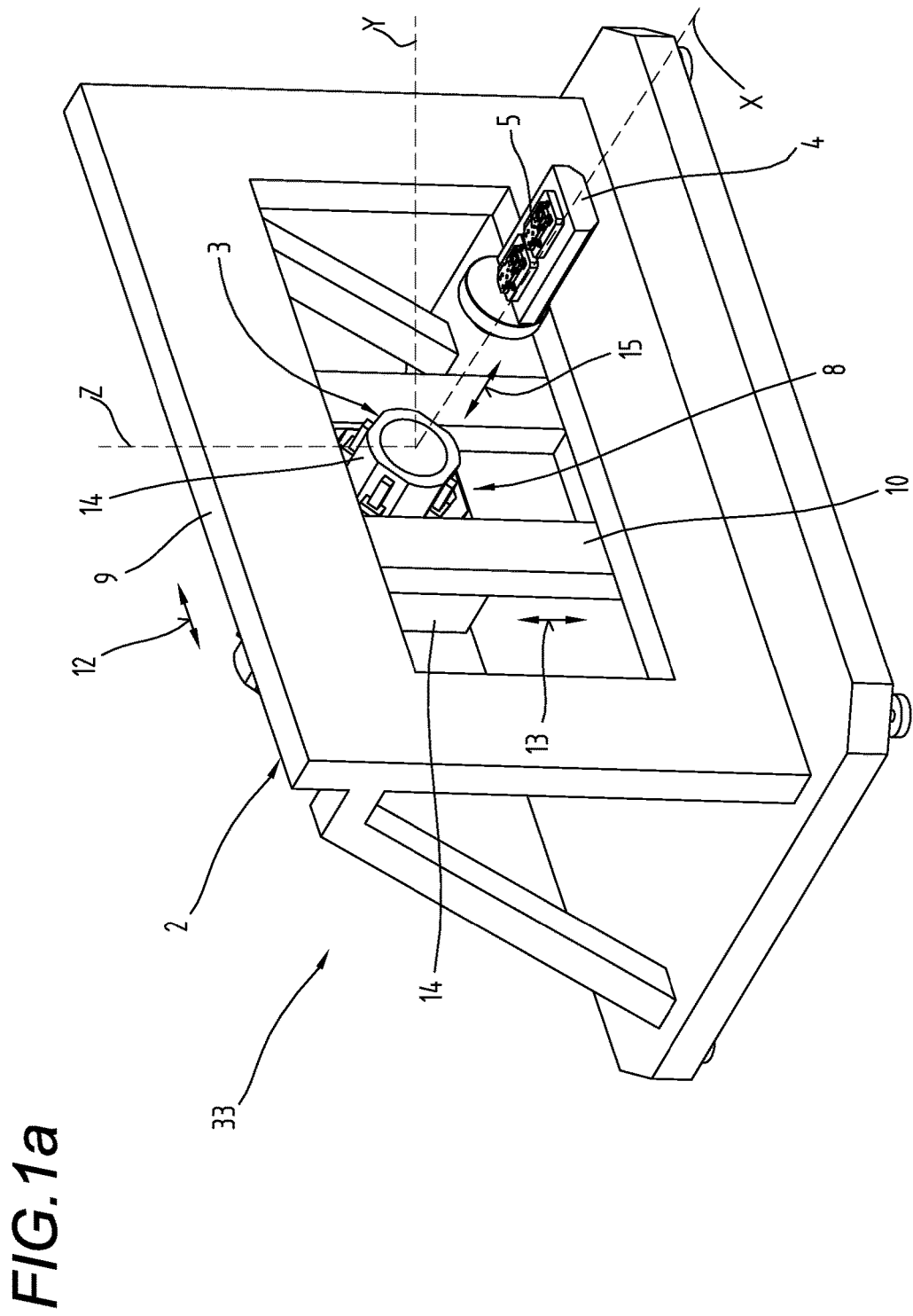
FIGS. 1a) through f) show an embodiment of the present position compensation system in which the pressure elements are situated in the region of the clamping point of the workpiece.

FIGS. 1a through 1f show an embodiment of the present position compensation system 1 in a transfer center 33 for machining workpieces 5. In this case, a workpiece manipulator 3 is situated in a machine frame 2, which workpiece manipulator 3 has a workpiece carrier flange-mounted to it. The workpieces 5 that are to be machined in parallel are clamped to the workpiece carrier 4 by means of separate clamping devices 6; the clamping achieves a stationary fixing of the workpieces 5; in particular, it secures the workpieces 5 to the workpiece carrier 4.

To illustrate the essential components of the present position compensation system, the other components of the transfer center 33, in particular the machine frame and the machining head, are not shown or are only shown in schematic form. What is essential for a transfer center 33 is that the workpieces 5 are guided to the tool spindles, which are usually situated in a stationary fashion in relation to the machine frame. This task is performed by the workpiece manipulator.

Figure 1C:
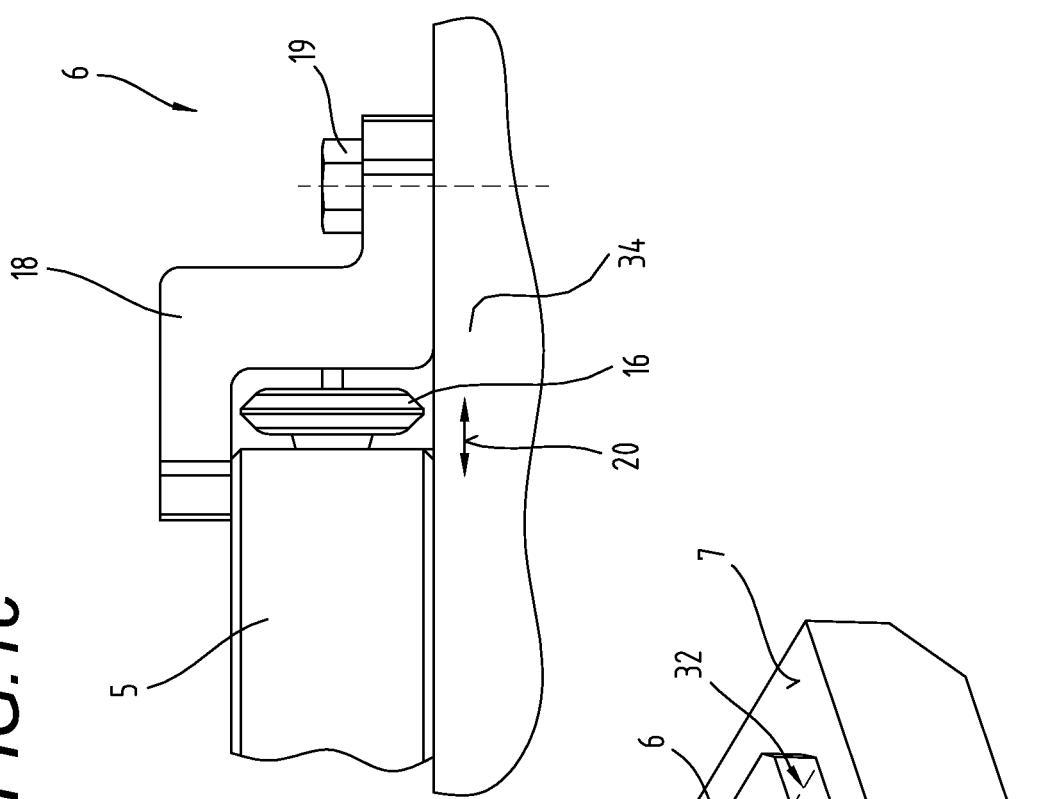
Figure 1B:
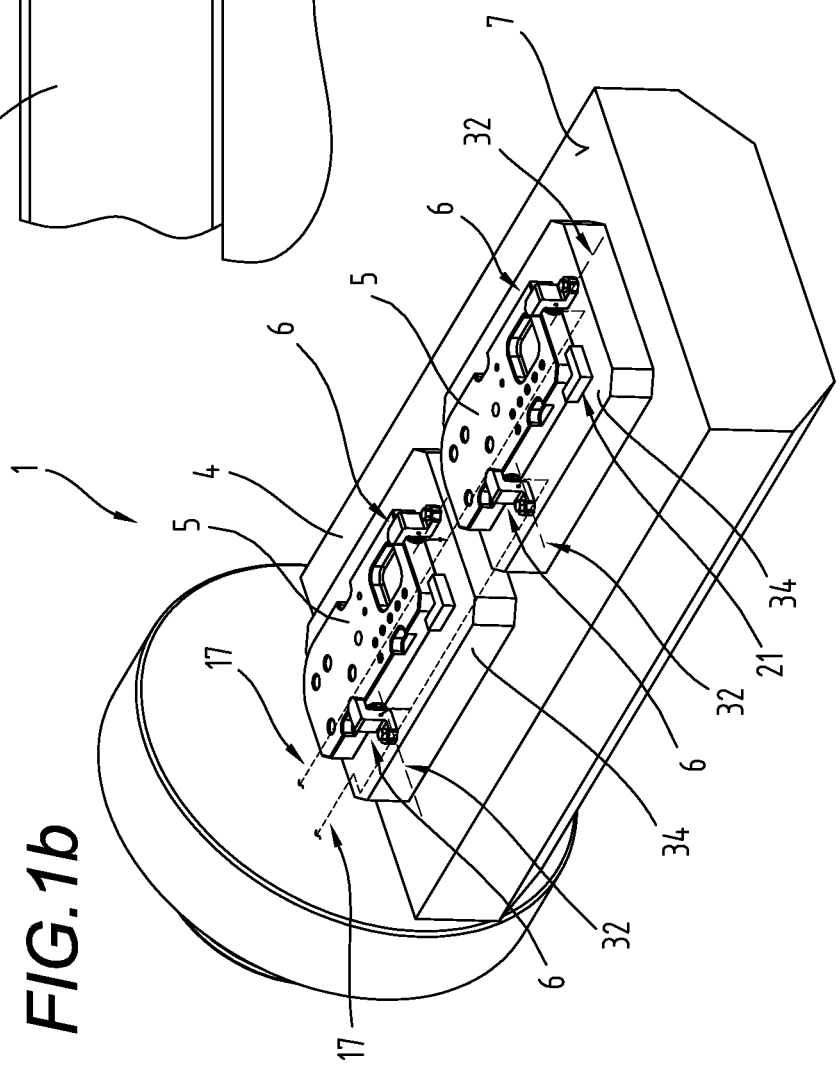
Figure 1F:
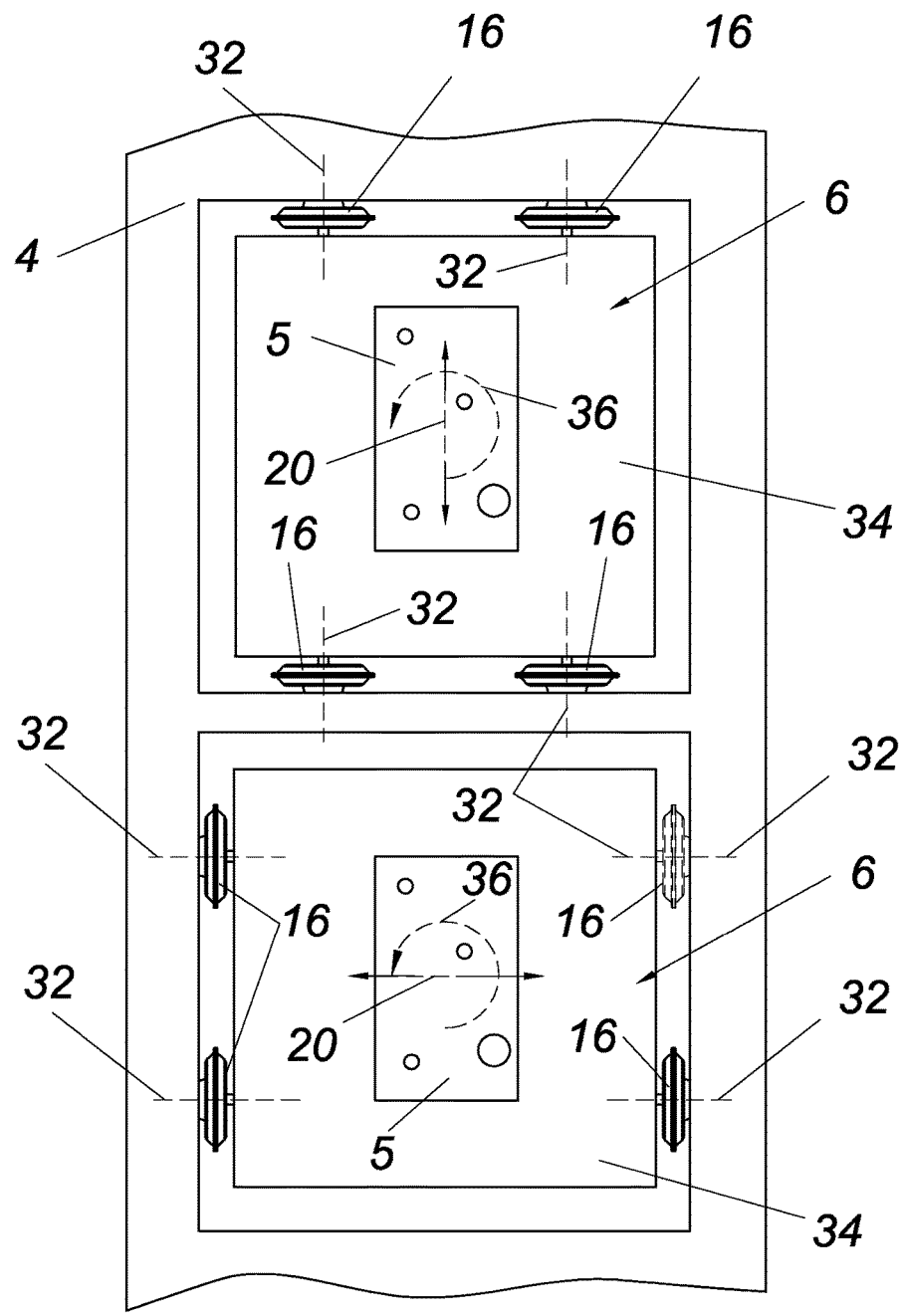
Figure 2A:
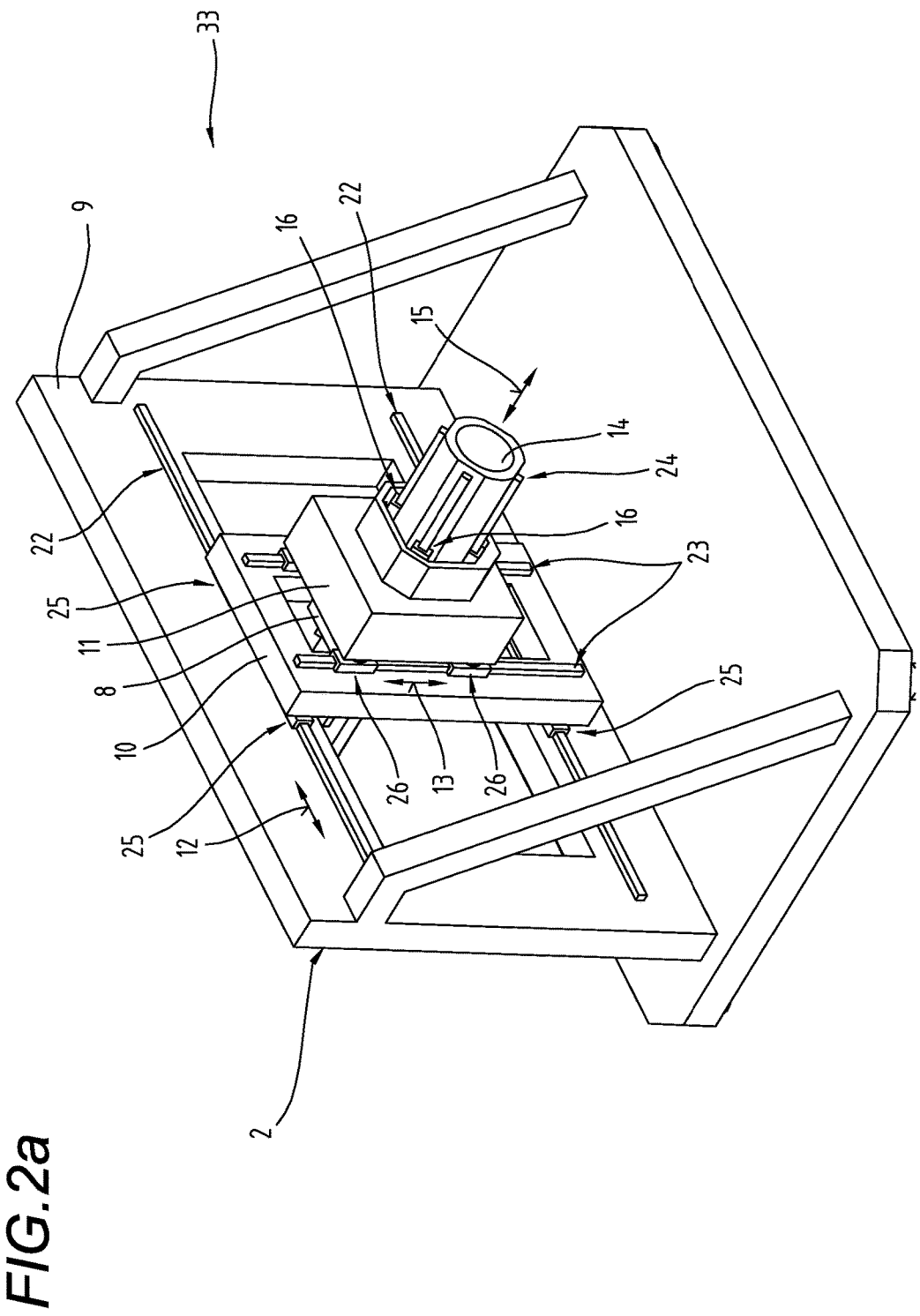
FIGS. 2a) and b) show another embodiment of the present position compensation system in which the pressure elements are situated in the region of the holder of the workpiece manipulator.

According to FIG. 2a, the workpiece manipulator 3 may possibly protrude with its workpiece carrier 4 through the open base frame 9 of the machine frame 2. This embodiment is shared by all of the embodiments according to FIGS. 1 through 4. A first carriage 10 and second carriage 11 are connected to the base frame 9. The first carriage 10 in this case can be moved in a first direction 12 relative to the base frame 9 and the second carriage 11 can be moved in a second direction 13 relative to the first carriage 10. The first carriage 10 and second carriage 11 are moved by drive means, which are not shown in the figures for the sake of simplicity.

The workpiece carrier 4 is flange-mounted to a flange support 14 and this flange support 14 is accommodated so that it is secured in the socket device 8. In order to simplify the depiction, the workpiece carrier in FIG. 1a is shown offset from the flange support. One modification can also be comprised in the fact that the flange support 14 can be moved relative to the socket device 8 in a third direction 15 and/or in that additionally or alternatively, it is possible to rotate the flange support 4 around the third direction 15. The drive means required for moving the flange support 14 is likewise not shown in the drawing, once again for the sake of simplicity.

Since an offset between a desired alignment position and the actual alignment position can occur during the clamping of the workpiece 5 to the workpiece carrier 4, at least two pressure elements 16 are situated between the workpiece 5 and the machine frame 2. In the embodiment variant shown, the two pressure elements are situated in the region of the clamping device 6. The pressure elements 16 are now situated in such a way that their operating directions 32 enclose an angle with each other and/or these operating directions 32 are linearly independent from a vectorial standpoint.

It is thus possible to move a clamped workpiece 5 relative to its clamping position and thus to compensate for slight position deviations of the workpiece 5. But these are only slight position adjustments since the workpiece 5 is situated so that it is essentially aligned precisely with the workpiece carrier 4. In one modification of a pressure element 16, it permits a position adaptation of +/−0.5 mm.

A position compensation of this kind is particularly advantageous if at least two workpieces 5 are simultaneously clamped to the workpiece carrier 4 and are machined in several places at once by the machining spindles that are situated in a largely stationary fashion in a machining head. In this connection, it is particularly important for the individual workpieces 5 to be correctly aligned in relation to each other and in relation to the tool spindles. Without the present position compensation system, the two workpieces 5 must be aligned exactly to each other and also to the machining spindles, which significantly increases the setup effort and precision of the transfer center. The effort required for positioning the workpieces rises disproportionately with the number of simultaneously clamped workpieces and/or the simultaneously executed machining steps. In this context, it is thus particularly advantageous if the exact fine positioning of the workpieces can be carried out by an automatic system. In addition, the position compensation system can be used to compensate for possible temperature-induced offsets of the machine components.

Since the pressure elements 16 are preferably embodied in the form of hydraulic pressure capsules, according to one modification, pressure lines 17 are provided in the workpiece carrier 4 and can be connected to the pressure elements 16 via connections, preferably in the support surface 7.

FIG. 1a shows a schematic representation of the socket of the flange support 14. FIG. 1b shows one possible embodiment of the workpiece carrier 4. FIG. 1c shows a possible detailed embodiment of the clamping devices 6, which have clamping brackets 18 in this embodiment. The clamping brackets 18 are each fastened to the clamping cradle 34 by means of a clamping element 19; through the geometrical embodiment of the clamping bracket 18, the respective workpiece 5 is pressed firmly against the clamping cradle 34 with which it is associated. In the instances shown according to FIGS. 1a and 1b, a respective pressure element 16 is situated between each clamping bracket 18 and the workpiece 5. The pressure elements 16 are thus arranged so that they are integrated into the respective clamping device 6. When pressure is exerted, a length change 20 occurs, which results in an offsetting of the workpiece 5 in the clamping device 6. Through the arrangement of at least these two pressure elements 16, whose operating directions enclose an angle with each other, as shown by way of example in FIG. 1a, it is possible to perform a position compensation for each workpiece 5, even after it has been clamped to the workpiece carrier 4 and/or clamped into the respective clamping devices 6. The clamped 5 can thus be moved biaxially.

According to FIG. 1d and FIG. 1e, additionally or alternatively to FIG. 1b and FIG. 1c, pressure elements 16 are situated between the clamping device 6 and the workpiece carrier 4. Each pressure element 16 engages a respective clamping cradle 34 of a clamping device 6, as can be inferred from FIG. 1d. Each respective clamping cradle 34 is fastened to the workpiece carrier 4 by means of a bracket 35. The pressure element 16 is provided between the bracket 35 and the clamping cradle 34. It is thus possible with a simplified design to enable a biaxial mobility between the two clamping devices 6 or workpieces 5 with the aid of two pressure elements 16. With a reciprocal position compensation of the two workpieces 5 on the workpiece carrier 4, these can now be machined in parallel in a precisely produced manner by the transfer center 33. In general, it should be noted that it is also conceivable to use fastening options other than the clamping bracket 18 and bracket 35 shown in FIGS. 1a through 1e.

It is naturally conceivable to provide more than one pressure element 16 between the clamping devices 6 and/or clamping cradles 34 and the workpiece carrier 4. Such a design is shown by way of example in FIG. 1f. It is thus possible, for example, to increase the variability in the position compensation of the workpieces 5 in that this enables not only a linear position change 20 on the clamping cradle 34, but also a rotating position change 36. As is shown in connection with the lower clamping device 6, three pressure elements 16 are sufficient to achieve this, but preferably, four pressure elements 16 are provided, as is shown in connection with the upper clamping device 6. The pressure elements 16 engage the respective clamping devices 6 with the same operating direction 32, which assigns them each an operating direction 32. It is thus easily possible to compensate for a deviation between the actual position and the desired position of the two workpieces 4 relative to each other; the design is also able to withstand high mechanical loads.

It is also evident from FIG. 1f that the clamping devices 6 are fastened to the workpiece carrier 4 so that they can move relative to the workpiece carrier 4 or are suspended on the workpiece carrier 4 by means of the pressure elements. This is used for a particularly precise fine adjustment of the clamping cradles 34.

In order to determine the required correction offset, it is possible to provide the workpiece carrier 4 with a position detection device 21 that determines the current actual position of the workpiece 5 in relation to the workpiece carrier 4, after which a control unit determines the correction to be made and the pressure exertion by the pressure elements 16 required to make it. The position detection device 21 can, for example, be equipped with contacts in the form of tracer pins, stop contacts, or the like, but a contactless detection is also possible, for example by means of distance measuring devices or the like that operate in an optical, acoustic, inductive, or capacitive way.

In addition to a module for evaluating the position and determining correction information, the control unit, not shown, also includes pressure control valves in order to preferably exert an individual pressure on each individual pressure element or possibly on groups of pressure elements.

Figure 2B:
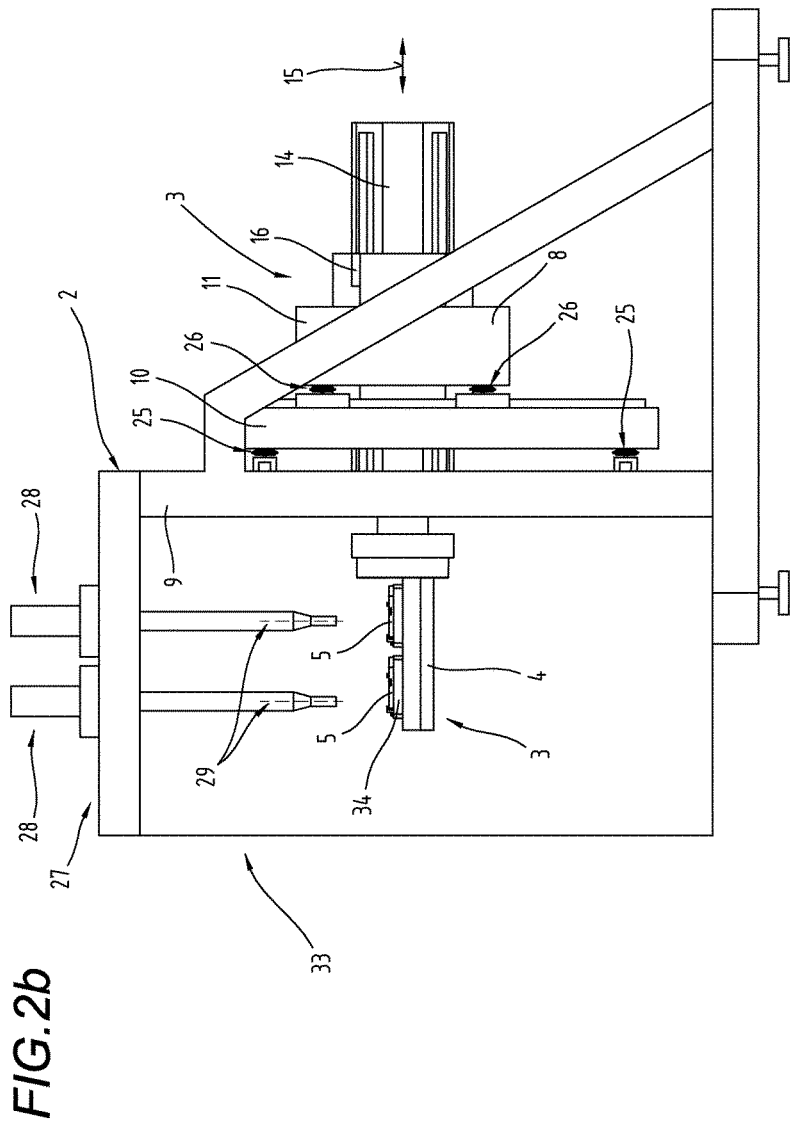

FIGS. 2a and 2b show another possible embodiment of the position compensation system 1. FIG. 2a shows a view of the base frame 9 from the rear; in order to simplify the depiction, the workpiece carrier mounted on the flange support 14 is not shown. The first carriage 10 and second carriage 11 are shown and in addition, the flange support 14 is held in the socket device 8.

The first carriage 10 can be moved relative to the base frame 9 by means of first rail guides 22 while the second carriage 11 can be moved relative to the first carriage 10 by means of second rail guides 23. Preferably, the flange holder 14 will also have a third rail guide 24, thus also enabling a movement of the flange holder 14 in the third direction 15. In this figure as well, the drive means is not shown for the sake of simplicity.

Here, too, at least two pressure elements 16 are once again situated between the workpiece on the workpiece carrier (not shown) and the machine frame 2 and their operating directions enclose an angle with each other.

In FIG. 2a, additional pressure elements are provided in addition to the two pressure elements 16; in particular, first pressure elements 25 are provided between the base frame 9 and the first carriage 10 while second pressure elements 26 are provided between the first carriage 10 and the second carriage 11.

FIG. 2b shows a simplified side view of a transfer center 33 in which a machining head 27 is situated in a machine frame 2 and several machining spindles 28 are situated in this machining head 27. The machining spindles 28 in this case are usually situated in stationary fashion in the machining head 27 and this machining head is in turn situated in stationary fashion in the machine frame 2. Consequently, the machining positions 29 of the tool spindles 28 are also predetermined in stationary fashion so that even slight deviations in the alignment of the workpieces 5 on the workpiece carrier 4, in relation to the machining positions, has a negative impact on the dimensional accuracy of the machining procedures performed.

In addition to inaccuracies in a clamping of the workpieces 5, there is also a positioning inaccuracy due to the fact that the relative position of the workpieces 5 to the machining positions 29 can change due to mechanical loads. In order to assume different machining positions, the flange support 14 of the workpiece manipulator 3 is extended along the third direction 15 (toward the left and the drawing). Consequently, the workpiece carrier 4 protrudes far out from the socket device 8, as a result of which merely due to the dead weight of the workpiece carrier 4 and workpiece(s) clamped to it and/or the mechanical loads due to the impact of machining tools of the tool spindles, a deformation of the workpiece manipulator 3 can occur. In particular, a deflection of the flange support 14 with the workpiece carrier 4 flange-mounted to it can occur. As a result, with machining positions 29 located far to the outside, for example the left tool spindle in FIG. 2b, a greater change in the relative position occurs than with tool spindles located closer in (right tool spindle in FIG. 2b). This would mean that workpieces clamped farther out will have greater deviations in the machining positions than workpieces clamped farther in. Aside from or in addition to the position deviation due to the mechanical deformation of the workpiece carrier 4 and/or of the flange support 14, it is also possible for the deviation to occur due to a slight incorrect alignment in the clamping of the workpiece 5. Through the arrangement of two pressure elements 16 as shown in FIGS. 2a and 2b, it is now possible to individually exert pressure on the guide of the flange support 14 in the socket device 8 so that with a uniform triggering of the two pressure elements 16, the deflection is possible and with individually different pressure control of the pressure elements 16, it is also possible to correct the position of clamped workpieces.

In addition, the triggering of the first pressure elements 25 and/or second pressure elements 26 permits a further individual correction of the alignment position of the workpiece relative to the machining position.

FIG. 3a shows a detailed depiction of the arrangement of the pressure elements 16 between the flange support 14 and the socket device 8 of the second carriage 11. The flange support 14 can move along its third rail guide 24 and can thus execute a position change in the third direction 15.

FIG. 3b shows a cross-section through the guide of the flange support 14 in the socket device 8; the section line has been selected so that both of the pressure elements 16 shown in FIG. 3a appear in the drawing. For example, the third rail guide 24 includes a plurality of guide rails 30 situated on the flange support 14, which are engaged by guide carriages 31. The guide carriage 31 is held by the socket device 8 so that an eight-point support of the flange support 14 is produced. The pressure elements 16 in this case are situated at only one bearing point so that when pressure is exerted, an offsetting of the flange support 14 in the region of the right bearing point in FIG. 3b is achieved. Due to the distance between the left, fixed bearing point and the right, movable bearing point, a lever arm is therefore produced, which makes it possible in accordance with the lever principle to correct a position deviation of the protruding tool holder by adapting the offset at the right bearing point.

Figure 4A:
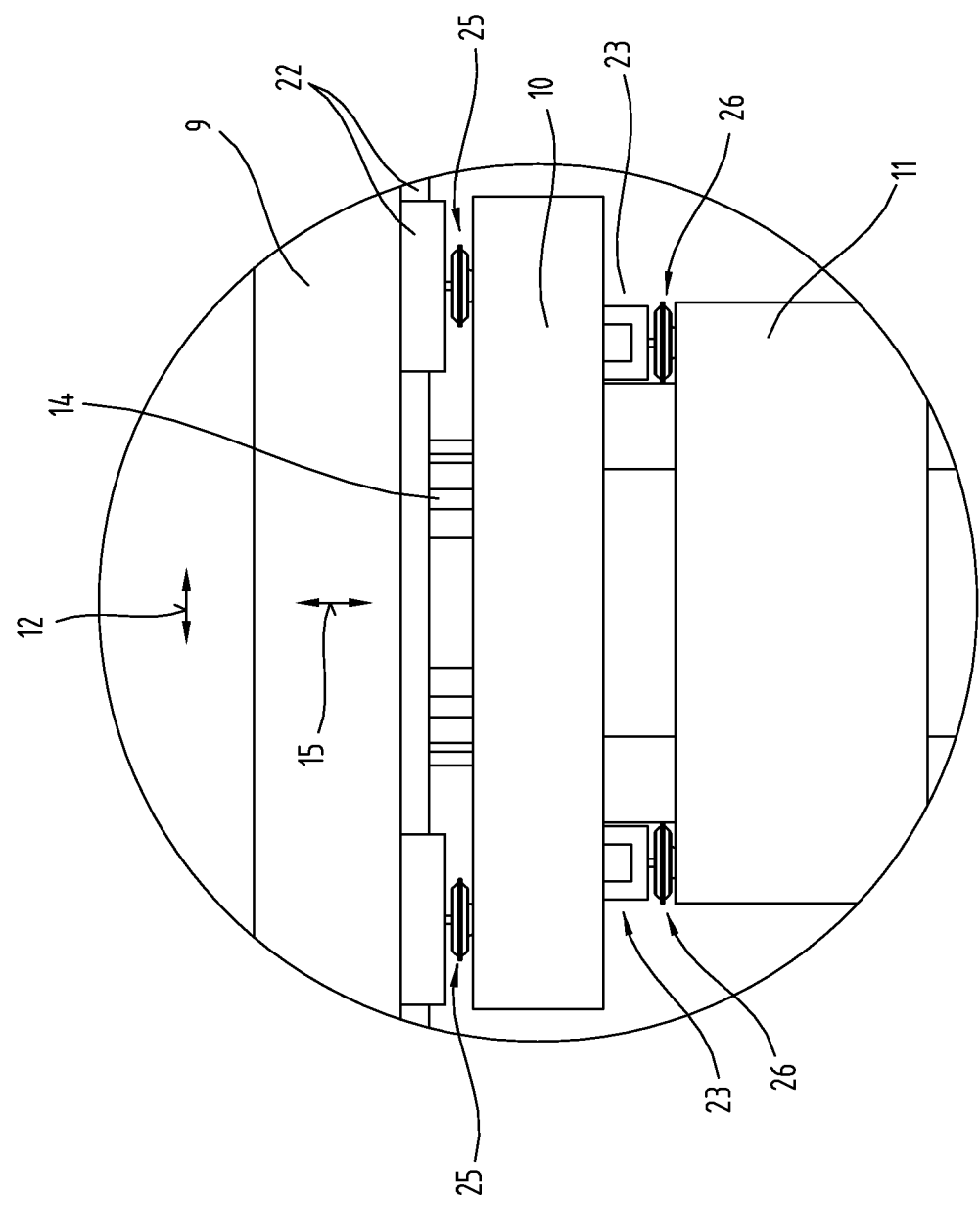
FIGS. 4 a) and b) show another detailed view of the arrangement of the pressure elements.

FIGS. 4a and 4b show a detailed view of the first pressure elements 25, in the region of the first rail guide 22 between the base frame 9 and the first carriage 10 and in the region of the second pressure elements 26 between the first carriage 10 and the second carriage 11. In the embodiment shown here, the first rail guide 22 and second rail guide 23 are likewise each composed of a rail and a guide carriage; the guide carriage is able to move along the guide rail and thus permit a change in the relative position of the first carriage 10 and second carriage 11. In the embodiment shown, a pressure element is situated on each guide carriage, a first pressure element 25 between each guide carriage of the first rail guide 22 and the first carriage 10 and a second pressure element 26 between the guide carriage of the second rail guide 23 and the second carriage 11. Consequently, by individually activating the individual pressure elements 25, 26, it is possible to influence the alignment or orientation of the flange support 14 individually. For example, if both of the first pressure elements 25 from FIG. 4a—these are hypothetically the two upper first pressure elements 25 from FIG. 4b—are uniformly acted on with pressure, then this achieves a pivoting of the flange support 14 in the plane of the second direction 13. It is likewise possible, through uniform pressure exertion of the two left, second pressure elements 26 from FIG. 4a—this corresponds to the upper and lower second pressure elements 26 from FIG. 4b—to produce a pivoting of the flange support 14 in the plane of the first direction 12. If all of the first pressure elements 25 and/or second pressure elements 26 are acted on uniformly with pressure, then it is possible to move the flange support in the third direction 15.

Through an individual triggering of the individual first pressure elements 25 and second pressure elements 26, it is now possible to individually adapt the position of the flange support 14 and therefore also of the workpiece clamped to the workpiece carrier in all three machining directions and therefore to achieve a very fine position compensation. In particular, by means of correspondingly rapid triggering of the pressure elements, i.e. by means of a rapid hydraulic control system, can be used to adapt the position individually for each individual machining step, without requiring laborious retooling work in order to achieve this.

FIGS. 4a and 4b show an embodiment with four pressure elements per guide rail. For simple embodiments or when a slight force or adjustment range is sufficient, it is also possible to provide only one pair of pressure elements per rail guide. Since the pressure elements also preferably function hydraulically, they can also be used to implement a holding function.

Finally, it should be noted that in the different embodiments described, parts that are the same have been provided with the same reference numerals and the same part names; the disclosures contained in the entire description can be transferred analogously to the same parts with the same reference numerals and the same part names. In addition, the location information selected in the description, e.g. upper, lower, side, etc. with reference to the figure being directly described and illustrated can, in the event of a location change, also be transferred to the new location. In addition, individual features or combinations of features from the different exemplary embodiments illustrated and described can also, in and of themselves, constitute independent solutions that are inventive or are in accordance with the invention.

The exemplary embodiments demonstrate possible embodiment variants of the position compensation system; it should be noted at this point that the invention is not limited to the specially shown embodiment variants themselves; instead, various combinations of the individual embodiment variants with one another are possible and this possibility for variation based on the teaching of technical actions by the present invention lies within the skill set of the person skilled in the art of this technical field. Consequently, the scope of protection includes all conceivable embodiment variants that are possible through combinations of individual details of the illustrated and described embodiment variants.

The figures provided show another embodiment of the position compensation system, which may possibly represent an independent embodiment in and of itself; once again, parts that are the same have been provided with the same reference numerals and part names as in the preceding figures. In order to avoid unnecessary repetitions, reference is hereby made to the detailed description of the preceding figures.

As a matter of form, it should be noted in conclusion that in order to better comprehend the design of the position compensation system, the latter and/or its components have sometimes been shown not to scale and/or enlarged and/or reduced in size.

The object underlying the independent inventive solutions can be inferred from the description.

Principally, the individual embodiments shown in FIGS. 1 through 4 constitute the subject of independent solutions according to the invention. The related statements and solutions according to the invention can be inferred from the detailed description of these figures.

The invention claimed is:

1. A transfer center for machining at least one workpiece, the transfer center comprising:
 a machine frame;
 a plurality of machining spindles arranged in the machine frame;
 a workpiece carrier on which at least one workpiece to be machined is arranged using a respective clamping device; and
 a workpiece manipulator arranged in the machine frame, onto which workpiece manipulator the workpiece carrier is flange-mounted and which is movable by a driving device in at least one spatial direction in relation to the machine frame;
 wherein in order to compensate for a deviation between an actual position and a desired position of the workpiece or workpieces, the transfer center further comprises a position compensation system with at least two pressure elements situated between the workpiece or workpieces and the machine frame, whose operating directions enclose an angle with each other for position compensation of the workpiece or workpieces relative to each other for precise parallel machining in the transfer center.

2. The transfer center according to claim 1, wherein the pressure element is composed of a hydraulic pressure element.

3. The transfer center according to claim 1, wherein the operating directions of the at least two pressure elements lie in a plane and/or the angle between the operating directions is a 90 degree angle.

4. The transfer center according to claim 1, wherein the pressure elements are situated between the clamping device or clamping devices and the workpiece carrier.

5. The transfer center according to claim 4, wherein at least two pressure elements with an angle between their operating directions each engage a clamping cradle of a clamping device.

6. The transfer center according to claim 4, wherein each clamping cradle of a clamping device is engaged by a pressure element or by a plurality of pressure elements with the same operating direction.

7. The transfer center according to claim 6, wherein, in order to compensate for a deviation between the actual position and the desired position of two workpieces relative to each other, each of their clamping devices is assigned a different operating direction.

8. The transfer center according to claim 4, wherein the clamping device is fastened to the workpiece carrier by the pressure elements.

9. The transfer center according to claim 1, wherein at least two pressure elements are integrated into a clamping device.

10. The transfer center according to claim 1, wherein two pressure elements are arranged opposite each other in the same operating direction and the workpiece is situated between the two pressure elements.

11. The transfer center according to claim 10, wherein at least one pressure element is additionally provided with an operating direction that is linearly independent of the other two pressure elements.

12. The transfer center according to claim 1, wherein the machining spindles are stationary.

13. The transfer center according to claim 1, wherein the machining spindles are arranged in a machining head situated in the machine frame.

14. The transfer center according to claim 1, wherein the pressure element is composed of a pressure capsule.

15. The transfer center according to claim 10, wherein the at least one pressure element is additionally provided with a parallel operating direction that is linearly independent of the other two pressure elements.

* * * * *